(12) United States Patent
Kim et al.

(10) Patent No.: US 9,829,749 B2
(45) Date of Patent: Nov. 28, 2017

(54) DISPLAY DEVICE AND METHOD OF MANUFACTURING THE SAME

(71) Applicant: Samsung Display Co., Ltd., Yongin-si, Gyeonggi-Do (KR)

(72) Inventors: Janghyun Kim, Yongin (KR); Minsu Kim, Yongin (KR); Taewoon Cha, Yongin (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 62 days.

(21) Appl. No.: 14/745,067

(22) Filed: Jun. 19, 2015

(65) Prior Publication Data
US 2016/0154261 A1    Jun. 2, 2016

(30) Foreign Application Priority Data
Nov. 28, 2014  (KR) .................. 10-2014-0169170

(51) Int. Cl.
*G02F 1/1339*    (2006.01)
*G02F 1/1335*    (2006.01)
*G02F 1/1333*    (2006.01)

(52) U.S. Cl.
CPC ...... *G02F 1/1339* (2013.01); *G02F 1/133351* (2013.01); *G02F 1/133512* (2013.01)

(58) Field of Classification Search
CPC ..... G02F 1/133351; G02F 2001/13398; G02F 1/136209; G02F 1/133512; G02F 1/1341; G02F 1/1333; H05K 2203/0228; Y10T 156/1052; H01L 51/524; H01L 51/5246
See application file for complete search history.

(56) References Cited

U.S. PATENT DOCUMENTS

| | | | |
|---|---|---|---|
| 2001/0012089 A1* | 8/2001 | Shiraishi | C03B 33/076 349/153 |
| 2002/0167634 A1* | 11/2002 | Watanabe | G02F 1/133512 349/153 |
| 2004/0135941 A1* | 7/2004 | Nam | G02F 1/133512 349/110 |
| 2007/0273821 A1* | 11/2007 | Liou | G02F 1/1339 349/153 |
| 2009/0231524 A1 | 9/2009 | Tanaka | |

(Continued)

FOREIGN PATENT DOCUMENTS

| | | |
|---|---|---|
| KR | 10-2000-0045984 A | 7/2000 |
| KR | 10-2012-0049707 A | 5/2012 |

(Continued)

*Primary Examiner* — Jia Pan
(74) *Attorney, Agent, or Firm* — Robert E. Bushnell, Esq.

(57) ABSTRACT

A display device and a method of manufacturing the display device are provided. The display device includes a display panel having a first substrate and a second substrate bonded to the first substrate and in which a display area displaying an image and a non-display area extending towards the outside of the display area are formed; a sealant arranged between the first substrate and the second substrate and surrounding the display area; wirings arranged on the first substrate; and a black matrix arranged on the second substrate, wherein a heat energy passing portion through which a heat energy applied from the outside towards the sealant passes is formed in the display panel.

7 Claims, 4 Drawing Sheets

(56) References Cited

U.S. PATENT DOCUMENTS

| | | | |
|---|---|---|---|
| 2010/0033660 A1* | 2/2010 | Yamada | G02F 1/133509 349/110 |
| 2011/0234967 A1* | 9/2011 | Kim | G02F 1/1339 349/155 |
| 2012/0261065 A1 | 10/2012 | Lee et al. | |
| 2012/0319574 A1 | 12/2012 | Kim et al. | |
| 2013/0033664 A1 | 2/2013 | Lee et al. | |
| 2013/0088661 A1 | 4/2013 | Shin et al. | |
| 2013/0242226 A1* | 9/2013 | Jeong | G06F 1/1637 349/58 |
| 2013/0286331 A1* | 10/2013 | Chen | G02F 1/1339 349/106 |
| 2015/0102304 A1* | 4/2015 | Go | H01L 51/5246 257/40 |
| 2015/0192811 A1* | 7/2015 | Kojima | G02F 1/1339 349/73 |
| 2015/0327361 A1* | 11/2015 | Wang | H05K 1/0296 174/250 |
| 2015/0362767 A1* | 12/2015 | Zhao | G02F 1/1339 349/153 |

FOREIGN PATENT DOCUMENTS

| | | |
|---|---|---|
| KR | 10-2012-0116809 A | 10/2012 |
| KR | 10-2012-0139075 A | 12/2012 |

* cited by examiner

DISPLAY DEVICE AND METHOD OF MANUFACTURING THE SAME

CLAIM OF PRIORITY

This application claims the priority of and all the benefits accruing under 35 U.S.C. §119 from Korean Patent Application No. 10-2014-0169170, filed on Nov. 28, 2014, in the Korean Intellectual Property Office ("KIPO"), the disclosure of which is incorporated herein in its entirety by reference.

BACKGROUND OF THE INVENTION

1. Field of Disclosure

One or more exemplary embodiments relate to a display device and a method of manufacturing the same.

2. Description of the Related Art

Generally, display devices include a liquid crystal display (LCD), an organic light-emitting display (OLED), an electrophoretic display (ED), a surface-conduction electron-emitter display (SED), and a vacuum fluorescent display panel (VFD).

The display devices may be used in mobiles devices, such as a smart phone, a tablet personal computer, a lap top computer, a digital camera, a camcorder, and a personal digital assistant (PDA), or electronic devices, such as an ultra-thin television, and an outdoor advertising panel.

Recently, display devices have been slimmed. To slim the display devices, a size of a bezel of the display devices needs to be minimized.

SUMMARY OF THE INVENTION

One or more exemplary embodiments include a display device and a method of manufacturing the same.

Additional aspects will be set forth in part in the description which follows and, in part, will be apparent from the description, or may be learned by practice of the presented embodiments.

According to one or more exemplary embodiments, a display device includes a display panel having a first substrate and a second substrate bonded to the first substrate, and in which a display area displaying an image and a non-display area extending towards the outside of the display area are formed; a sealant arranged between the first substrate and the second substrate and surrounding the display area; wirings arranged on the first substrate; and a black matrix arranged on the second substrate, wherein a heat energy passing portion through which a heat energy applied from the outside passes towards the sealant is formed in the display panel.

At least a portion of the black matrix may vertically overlap the sealant, and the heat energy passing portion may be a space generated by removing the portion of the black matrix overlapping the sealant.

A heat energy blocking portion may be formed on the first substrate in a pathway of the heat energy passing from an upper portion of the second substrate through the heat energy passing portion. The heat energy passing portion and the heat energy blocking portion surround the display area.

The heat energy blocking portion may have a dam shape formed of a polymer resin to prevent overflow of a raw material for an alignment layer spreading in the display area over the non-display area. The dam shape may include a rectangular, triangular, semi-circular, semi-oval, concave, and convex cross-section.

The heat energy blocking portion may be a blue photoresist.

An over-coating layer completely covering the black matrix may be further formed on the second substrate, and a common electrode may be formed on the over-coating layer.

The sealant may have a black color.

The wirings may be arranged below the sealant. A passivation layer covering the wirings may be formed between the wirings and the sealant. The heat energy passing portion may be a space generated by removing a portion of the wirings.

The black matrix may be located on the second substrate in a pathway of the heat energy passing from a bottom portion of the first substrate through the heat energy passing portion.

An over-coating layer completely covering the black matrix may be further formed on the second substrate. A common electrode may be formed on the over-coating layer. The common electrode may be electrically connected to the wirings through a electrical short point.

The sealant may include a material having electrical conductivity. The sealant and the wirings may be electrically connected to each other by a connection portion in order to form the short point between the common electrode and the wirings.

An electrically conductive spacer may be provided between the first substrate and the second substrate, and the common electrode and the wirings may be electrically connected to each other through the electrically conductive spacer in order to form the short point between the common electrode and the wirings.

Widths of the wirings may increase in order from the wirings adjacent to the heat energy passing portion to the wirings apart from the heat energy passing portion.

Gaps between the wirings may increase in order from the wirings adjacent to the heat energy passing portion to the wirings apart from the heat energy passing portion.

A liquid crystal may be formed between the first substrate and the second substrate, and the display device may further include a liquid crystal display in which a backlight unit irradiating light towards the display panel is provided below the display panel.

According to one or more exemplary embodiments, a method of manufacturing a display device includes: preparing a display panel in which a display area and a non-display area extending toward the outside of the display area are formed and which has a first substrate on which wirings are arranged and a second substrate on which a black matrix is formed; forming a sealant between the first substrate and the second substrate and using the sealant to bond the first substrate and the second substrate; and cutting the first substrate and the second substrate by applying a heat energy, wherein a heat energy passing portion through which the heat energy applied from the outside passes towards the sealant is formed in the display panel, and the heat energy passes through the heat energy passing portion and is applied to a portion in which the sealant is formed.

At least a portion of the black matrix may overlap the sealant. The heat energy passing portion may be a space generated by removing the portion of the black matrix overlapping the sealant. The heat energy may be applied to the sealant by passing from the outside of the second substrate through the space generated by removing the black matrix.

A heat energy blocking portion may be further formed on the first substrate in a pathway of the heat energy passing from an upper portion of the second substrate through the heat energy passing portion.

The wirings may be arranged below the sealant. A passivation layer covering the wirings may be formed between the wirings and the sealant. The heat energy passing portion may be a space generated by removing a portion of the wirings. The heat energy may be applied to the sealant by passing from an outside of the first substrate through the space generated by removing the wirings.

The black matrix may be located on the second substrate in a pathway of the heat energy passing from a bottom portion of the first substrate through the heat energy passing portion.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

It will be understood that although the terms "first," "second," etc. may be used herein to describe various components, these components should not be limited by these terms. These components are only used to distinguish one component from another.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof.

Reference will now be made in detail to embodiments, examples of which are illustrated n the accompanying drawings. In the drawings, the same elements are denoted by the same reference numerals, and a repeated explanation thereof will not be given.

Figure 1:
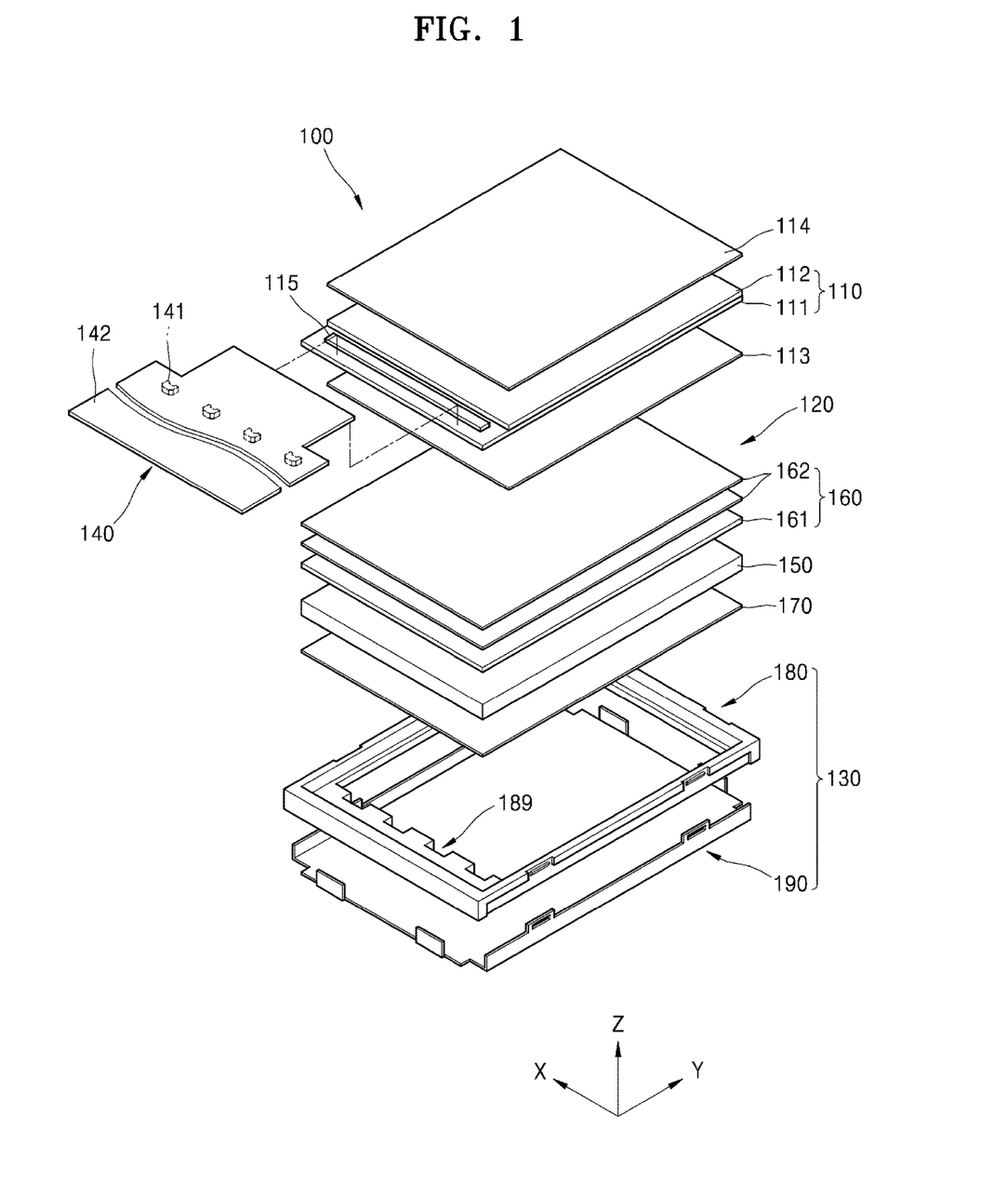
FIG. 1 is an exploded perspective view of a display device according to an embodiment.

FIG. 1 is an exploded perspective view of a display device 100 according to an embodiment.

Hereinafter, the display device 100 is exemplified as a liquid crystal display. However, the display device 100 is not limited thereto and may include all display devices displaying an image when power is applied, such as an organic light-emitting display, a field emission display (FED), and an electronic paper display (EPD).

Referring to FIG. 1, the display device 100 includes a display panel 110, a backlight unit 120, and a housing 130. The backlight unit 120 includes a light-source unit 140, a light guide panel 150, a plurality of optical sheets 160, and a reflection sheet 170.

The display panel 110 includes a first substrate 111, a second substrate 112 facing the first substrate 111, and a liquid crystal (not shown) injected between the first substrate 111 and the second substrate 112.

A first polarizing plate 113 may be bonded to an outer surface of the first substrate 111, and a second polarizing plate 114 may be bonded to an outer surface of the second substrate 112.

A driver IC 115 may be provided at an edge of the first substrate 111. The driver IC 115 generates a driving signal for driving the display panel 110 with a voltage applied from the outside. The driver IC 115 may be electrically connected to the display panel 110 by an electrically conductive adhesive such as an anisotropic electrically conductive film (ACF).

The light-source unit 140 includes a light-source device 141 supplying a light to a side surface of the light guide panel 150, and a circuit board 142 in which the light-source device 141 is mounted.

The light-source device 141 may be a light-emitting diode. A plurality of light-source devices 141 are arranged apart from each other on the circuit board 142.

The circuit board 142 is electrically connected to the boundary of the first substrate 111 and transfers an electrical signal to the display panel 110. The circuit board 142 may be a flexible printed circuit board (FPCB).

The light guide panel 150 may be provided below the display panel 110. The light guide panel 150 provides the light generated from the light-source device 141 to the display panel 110.

The plurality of optical sheets 160 may be interposed between the display panel 110 and the light guide panel 150. The optical sheet 160 includes at least one sheet to improve light efficiency. According to the present embodiment, the plurality of optical sheets 160 include a diffuser sheet 161 for diffusing the light emitted from the light guide panel 150, and at least one prism sheet 162 arranged above the diffuser sheet 161 and condensing the light.

The reflection sheet 170 may be provided on a rear surface of the light guide panel 150, which is opposite to a surface on which the plurality of optical sheets 160 are provided. The reflection sheet 170 reflects the light passing through a bottom of the light guide panel 150 toward the display panel 110.

The housing 130 includes a mold frame 180 and a case 190.

The mold frame 180 may provide a space for accommodating the light guide panel 150, the plurality of optical sheets 160, and the reflection sheet 170. The mold frame is a square-shaped frame in which an opening is formed. The mold frame 180 may be mounted in the case 190. A plurality of accommodating grooves 189 for accommodating the plurality of light-source devices 141 may be formed in the mold frame 180.

The case 190 may be coupled to the mold frame 180 by a coupling method, such as a hook combination.

Meanwhile, an auxiliary case (not shown) may further be provided on the case 190 to be coupled to the case 190. The auxiliary case may cover the display panel 110, the backlight unit 120, and the mold frame 180.

Figure 2:
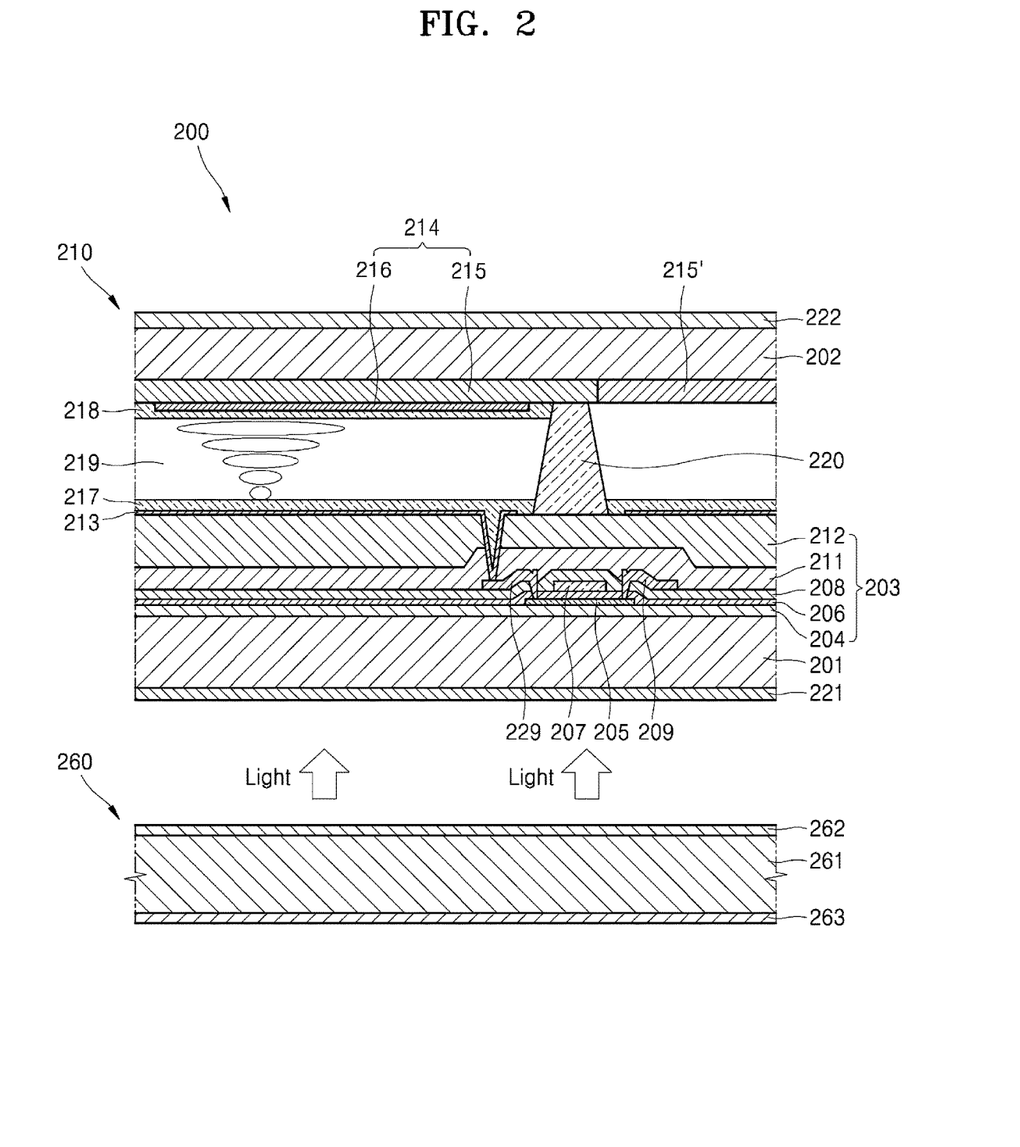
FIG. 2 is a cross-sectional view of a display device according to another embodiment.

FIG. 2 is a cross-sectional view of a display device 200 according to another embodiment.

Referring to FIG. 2, the display device 200 includes a display panel 210, and a backlight unit 260 irradiating light toward the display panel 210.

The display panel 210 includes a first substrate 201, and a second substrate 202 facing the first substrate 201. The first substrate 201 and the second substrate 202 may be a glass substrate or a polymer substrate.

A first function layer 203 may be formed on the first substrate 201.

A barrier layer 204 may be formed on the first substrate 201. The barrier layer 204 planarizes a surface of the first substrate 201 and prevents penetration of impurities.

A thin film transistor (TFT) may be formed on the barrier layer 204.

In detail, a semiconductor active layer 205 may be formed on the barrier layer 204. The semiconductor active layer 205 may be formed of amorphous silicon, an organic semiconductor, or an inorganic semiconductor, such as polysilicon.

A gate insulating layer 206 may be formed on the semiconductor active layer 205. The gate insulating layer 206 includes an inorganic layer, such as silicon oxide, silicon nitride, and metal oxide.

A gate electrode 207 may be formed on the gate insulating layer 206. The gate electrode 207 includes a single layer, such as Au, Ag, Cu, Ni, Pt, Pd, Al, Mo, and Cr, or multiple layers. According to the present embodiment, the gate electrode 207 includes an alloy, such as Al:Nd and Mo:W.

An interlayer insulating layer 208 may be formed on the gate electrode 207.

A source electrode 209 and a drain electrode 229 may be formed on the interlayer insulating layer 208. In detail, a contact hole is formed on the gate insulating layer 206 and the interlayer insulating layer 208 by selectively removing the gate insulating layer 206 and the interlayer insulating layer 208. In this case, the source electrode 209 may be electrically connected to a source region of the semiconductor active layer 205 through the contact hole, and the drain electrode 229 may be electrically connected to a drain region of the semiconductor active layer 205 through the contact hole.

A passivation layer 211 may be formed on the source electrode 209 and the drain electrode 229. The passivation layer 211 may be formed of an inorganic layer, such as silicon oxide or silicon nitride, or an organic layer.

A planarization layer 212 may be formed on the passivation layer 211. The planarization layer 212 may include an organic layer, such as acryl, polyimide, and benzocyclobutene (BCB).

The passivation layer 211 or the planarization layer 212 may be omitted.

A contact hole is formed by selectively removing the passivation layer 211 and the planarization layer 212. In this case, a first electrode 213 may be electrically connected to the source electrode 209 or the drain electrode 229 through the contact hole.

A second function layer 214 may be formed below the second substrate 202.

A color filter layer (215, 215') may be formed on a bottom surface of the second substrate 202. A second electrode 216 may be formed on a bottom surface of the color filter layer (215, 215').

A first alignment layer 217 may be formed on a top surface of the first electrode 213 and a second alignment layer 218 may be formed on a bottom surface of the second electrode 216. A liquid crystal 219 may be formed between the first alignment layer 217 and the second alignment layer 218. An electrically conductive spacer 220 dividing the liquid crystal 219 may be formed between the color filter layer (215, 215') and the planarization layer 212.

Meanwhile, a first polarizing plate 221 may be formed on an outer surface of the first substrate 201. A second polarizing plate 222 may be formed on an outer surface of the second substrate 202.

The backlight unit 260 may be provided on a rear side of the display panel 210. The backlight unit 260 includes a light-source device (not shown), and a light guide panel 261 guiding light emitted from the light-source device toward the display panel 210.

An optical sheet 262 may be provided between the display panel 210 and the light guide panel 261. The optical sheet 262 includes at least one sheet, that is, a diffuser sheet or a prism sheet. A reflection sheet 263 may be provided on a rear surface of the light guide panel 261, which is an opposite surface to a surface on which the optical sheet 262 is provided.

In the display device 200 having the above-described structure, a sealant (not shown in FIGS. 1 and 2) is interposed and bonded between the first substrate 201 and the second substrate 202 facing the first substrate 201, and a size of a bezel of the display panel 210 is minimized, by cutting a portion in which the sealant is formed.

Figure 3:
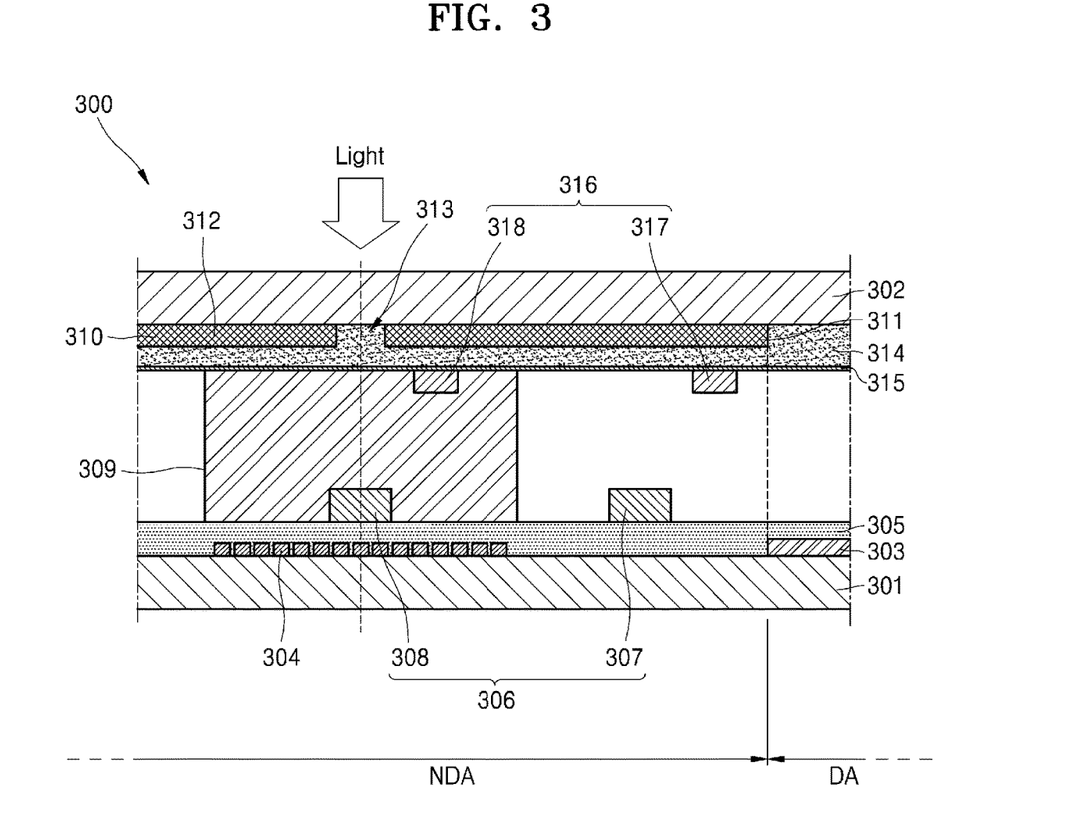
FIG. 3 is a cross-sectional view of a display panel in which a heat energy passing portion is provided, according to an embodiment.

FIG. 3 is a cross-sectional view of a display panel 300 in which a heat energy passing portion 313 is formed, according to an embodiment.

Referring to FIG. 3, the display panel 300 includes a first substrate 301, and a second substrate 302 facing the first substrate 301. The display panel 300 includes a display area DA displaying an image and a non-display area NDA extending towards the outside of the display area DA.

A display portion 303 may be formed on the first substrate 301. The display portion 303 may realize a desired image according to an applied driving voltage.

A sealant 309 may be disposed between the first substrate 301 and the second substrate 302. The sealant 309 surrounds the display area DA. The sealant 309 may be formed of a material which is melted when a predetermined heat energy is applied.

Wirings 304 may be arranged on a top surface of the first substrate 301.

The wirings 304 may be common power wirings. The wirings 304 may be arranged to be apart from one another in a multiple number. The wirings 304 may be interconnected and the same electrical signal may be applied to the interconnected wirings 304 from the outside.

The wirings 304 may be located below the sealant 309. A passivation layer 305 completely covering the wirings 304 may be formed between the wirings 304 and the sealant 309.

An alignment layer (refer to 217 of FIG. 2) may further be formed on the passivation layer 305. When forming the alignment layer, a raw material for an alignment layer that is spread in the display area DA may flow over the non-display area NDA.

To prevent the overflowing of the raw material for an alignment layer, a first blocking wall 306 may be formed in the non-display area NDA. In detail, at least one first blocking wall 306 is formed on the passivation layer 305. The first blocking wall 306 may be formed along a circumference of the display portion 303. The first blocking wall 306 may have a dam shape formed of a polymer resin.

According to the present embodiment, the first blocking wall 306 includes a first blocking portion 307 arranged between the display portion 303 and the sealant 309, and a second blocking portion 308 formed in the sealant 309. The number of the first blocking walls 306 is not limited thereto.

Since the first blocking wall 306 is formed to be higher than the alignment layer, the first blocking wall 306 may prevent the raw material for an alignment layer from flowing over the non-display area NDA from the display area DA.

A black matrix 310 may be formed on a bottom surface of the second substrate 302.

The black matrix 310 may extend from a boundary between the display area DA and the non-display area NDA to an edge of the second substrate 302.

An over-coating layer 314 may be formed on the black matrix 301. The over-coating layer 314 may cover the black matrix 310. The over-coating layer 314 planarizes an upper portion of the second substrate 302. The over-coating layer 314 may be an organic layer.

An electrode 315 may be formed on a top surface of the over-coating layer 314. The electrode 315 may be a common electrode covering the display area DA and the non-display area NDA on the second substrate 302.

An alignment layer (refer to 218 of FIG. 2) may further be formed on the electrode 315. Like the case of the first substrate 301, at least one second blocking wall 316 may be formed on the second substrate 302 to prevent a raw material for an alignment layer from flowing over the non-display area NDA from the display area DA.

According to the present embodiment, the second blocking wall 316 includes a third blocking portion 317 arranged between the display portion 303 and the sealant 309, and a fourth blocking portion 318 formed in the sealant 309.

Here, a cutting process may be performed in a portion in which the sealant 309 is formed. As illustrated by using an arrow, a heat energy may be applied from an upper portion of the second substrate 302 toward the sealant 309. The heat energy may be a laser beam irradiated by a laser device.

However, when the heat energy is applied from the upper portion of the second substrate 302, the heat energy has to sequentially pass through the black matrix 310, the over-coating layer 314, and the electrode 315, and thus, a loss in the heat energy is great. In particular, when the heat energy is applied to the black matrix 310, outgassing may occur.

According to the present embodiment, a heat energy passing portion 313 through which the applied heat energy, that is the laser beam, passes towards the sealant 309 is formed on the second substrate 302.

In detail, at least a portion of the black matrix 310 may be arranged to vertically overlap the sealant 309. The heat energy passing portion 313 may be located in a portion in which the black matrix 310 overlapping the sealant 309 is formed, and may be a space that is generated by removing the portion of the black matrix that overlaps the sealant 309.

The black matrix 310 includes a first black matrix 311 and a second black matrix 312 that are spaced apart from each other with the heat energy passing portion 313 between the first black matrix 311 and the second black matrix 312. The heat energy passing through the heat energy passing portion 313 may be irradiated to the sealant 309. According to the present embodiment, the heat energy passing portion 313 may be located in a portion corresponding to a center of a width direction of the sealant 309.

Meanwhile, a heat energy blocking portion may be formed on the first substrate 301 in a pathway of the heat energy passing through the heat energy passing portion 313.

According to the present embodiment, the heat energy blocking portion corresponds to the second blocking portion 308 of the first blocking wall 306. Since the heat energy passing portion 313 is formed by removing a portion of the black matrix 310, light leaks occur in a portion in which the heat energy passing portion 313 is formed. The second blocking portion 308 of the first blocking wall 306 may prevent the light leaks.

According to the present embodiment, the heat energy blocking portion may be formed during the process of forming the first blocking wall 306. However, the heat energy blocking portion may be formed by an additional process other than the process of forming the first blocking wall 306.

The second blocking portion 308 of the first blocking wall 306 that corresponds to the heat energy blocking portion may be a blue photoresist. The blue photoresist has shorter wavelengths than a red photoresist or a green photoresist.

According to the present embodiment, the sealant 309 may have a black color. When the sealant 309 is black, the sealant 309 has a high heat energy absorption, and thus, the efficiency with respect to a heat energy output may increase. In addition, light leaks may be prevented by using the black sealant 309.

A method of manufacturing the display panel 300 having the above-described structure will be described briefly.

The first substrate 301 and the second substrate 302 facing the first substrate 301 are prepared.

The wirings 304 and the passivation layer 305 covering the wirings 304 are formed on the first substrate 301 in the non-display area NDA. The second blocking portion 308 corresponding to the heat energy blocking portion is formed on the passivation layer 305.

The black matrix 310, the over-coating layer 314, and the common electrode 315 are formed on the second substrate 302. The black matrix 310 extends from the boundary between the display area DA and the non-display area NDA to the non-display area NDA. The heat energy passing portion 313 through which the heat energy passes through is formed on the black matrix 310 by removing a portion of the black matrix 310. The first black matrix 311 and the second black matrix 312 are arranged apart from each other with the heat energy passing portion 313 between the first black matrix 311 and the second black matrix 312.

The sealant 309 is formed between the first substrate 301 and the second substrate 302, and the first substrate 301 and the second substrate 302 are bonded to each other by hardening the sealant 309.

Next, the heat energy is applied from the outside of the second substrate 302 toward the sealant 309. The heat energy applied from the outside passes through the heat energy passing portion 313 and is irradiated to the sealant 309. Accordingly, as illustrated by using a dotted line, the first substrate 301 and the second substrate 302 are cut in a portion in which the sealant is formed 309. According to the present embodiment, after the heat energy is applied toward the sealant 309, the first substrate 301 and the second substrate 302 may be cut by using a cutting wheel.

Figure 4:
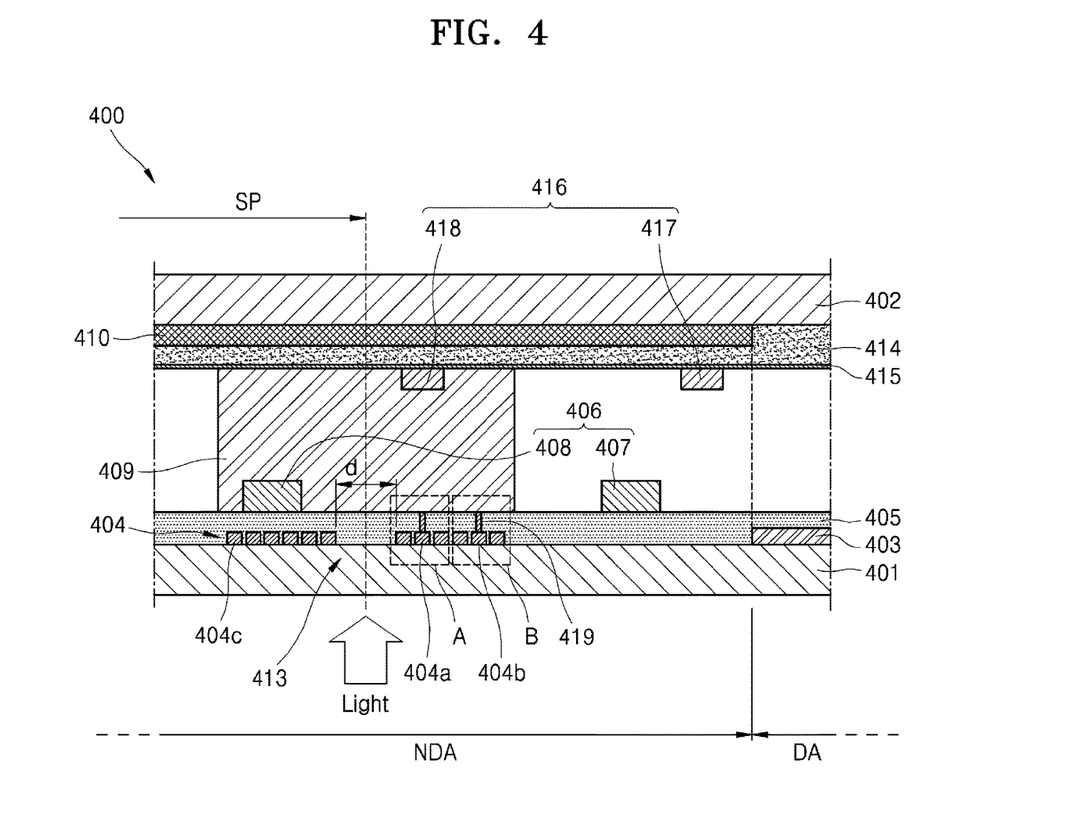
FIG. 4 is a cross-sectional view of a display panel in which a heat energy passing portion is provided, according to another embodiment.

FIG. 4 is a cross-sectional view of a display panel 400 in which a heat energy passing portion 413 is formed, according to another embodiment.

Referring to FIG. 4, the display panel 400 includes a first substrate 401, and a second substrate 402 facing the first substrate 401. The display panel 400 includes a display area DA displaying an image, and a non-display area NDA extending towards the outside of the display area DA. A display portion 403 is formed on the first substrate 401.

A sealant 409 may be disposed between the first substrate 401 and the second substrate 402. The sealant 409 surrounds a circumference of the display area DA. The sealant 409 may be formed of a material that is melted when a predetermined heat energy is applied.

Wirings 404 may be arranged on a top surface of the first substrate 401.

The wirings 404 may be common power wirings. The wirings 404 may be arranged to be apart from one another in a multiple number. The wirings 404 may be interconnected and the same electrical signal may be applied to the interconnected wirings 404 from the outside.

The wirings 404 may be located below the sealant 409. A passivation layer 405 covering the wirings 404 may be formed between the wirings 404 and the sealant 409.

A first blocking wall 406 may be formed in the non-display area DA.

In detail, at least one first blocking wall 406 may be formed on the passivation layer 405. The first blocking wall 406 may be formed along a circumference of the display portion 403. The first blocking wall 406 may have a dam shape formed of a polymer resin.

According to the present embodiment, the first blocking wall 406 includes a first blocking portion 407 arranged between the display portion 403 and the sealant 409, and a second blocking portion 408 formed in the sealant 409. The first blocking wall 406 may efficiently prevent the raw material for an alignment layer from flowing over the non-display area NDA from the display area DA.

A black matrix 410 may be formed on a bottom surface of the second substrate 402.

The black matrix 410 may extend from a boundary between the display area DA and the non-display area NDA to an edge of the second substrate 402.

An over-coating layer 414 may be formed on the black matrix 401. The over-coating layer 414 covers the black matrix 410. The over-coating layer 414 may be an organic layer.

An electrode 415 may be formed on a top surface of the over-coating layer 414. The electrode 415 may be a common electrode covering the display area DA and the non-display area NDA on the second substrate 402.

At least one second blocking wall 416 may be formed on the electrode 415 to prevent the raw material for an alignment layer from flowing over the non-display area NDA from the display area DA.

According to the present embodiment, the second blocking wall 416 includes a third blocking portion 417 arranged between the display portion 403 and the sealant 409, and a fourth blocking portion 418 formed in the sealant 409.

Here, a cutting process may be performed in a portion in which the sealant 409 is formed. For example, the heat energy may be applied from a bottom portion of the first substrate 401 toward the sealant 409. The heat energy may be a laser beam irradiated by a laser device.

According to the present embodiment, a heat energy passing portion 413 through which the heat energy applied from the outside towards the sealant 409 passes may be formed on the first substrate 401.

In detail, the heat energy passing portion 413 may be a space that is generated by removing a portion of the wirings 404.

The wirings 404 include first wirings 404a, second wirings 404b arranged adjacent to the first wirings 404a, and third wirings 404c arranged on an opposite side to the first and second wirings 404a and 404b with the heat energy passing portion 413 between the first and second wirings 404a and 404b and the third wirings 404c. According to the present embodiment, the heat energy passing portion 413 may be located in a portion corresponding to a center of a width direction of the sealant 409.

The electrode 415 may be electrically connected to the wirings 404 through a short point SP. In detail, the sealant 409 may be a material having electrical conductivity. The sealant 409 and the wirings 404 are electrically connected to each other by a connection portion 419, thereby forming the short point SP. According to the present embodiment, an additional electrically conductive spacer connecting the wirings 404 and the electrode 415 may be formed between the first substrate 401 and the second substrate 402 in order to form the short point SP between the wirings 404 and the electrode 415.

A location in which the short point is applied may move toward the center of the width direction of the sealant 409, in consideration of a removal of wirings in the heat energy passing portion 413 to which the heat energy is irradiated.

The wirings 404 may be formed such that each wiring 404 has a different width and each gap between the wirings 404 is different, in consideration of the resistance of wirings. In detail, the width of the wiring 404 may increase in order from a portion A in which the first wirings 404a adjacent to the heat energy passing portion 413 are formed to a portion B in which the second wirings 404b arranged apart from the heat energy passing portion 413 are formed. According to the present embodiment, the gap between the wirings 404 may increase in order from the portion A in which the first wirings 404a are formed to the portion B in which the second wirings 404b are formed.

Meanwhile, the black matrix 410 may be located on the second substrate 402 in a pathway of the heat energy passing through the heat energy passing portion 413 from the bottom portion of the first substrate 401.

A method of manufacturing the display panel 400 having the above-described structure will be described briefly.

The first substrate 401 and the second substrate 402 facing the first substrate 401 are prepared.

The wirings 404 and the passivation layer 405 covering the wirings 404 are formed on the first substrate 401 in the non-display area NDA. The heat energy passing portion 413 which is a space generated by removing a portion of the wirings 404 is formed in a portion in which the wirings 404 are formed.

The black matrix 410, the over-coating layer 414, and the common electrode 514 are formed on the second substrate 402.

The sealant 409 is formed between the first substrate 401 and the second substrate 402, and the first substrate 401 and the second substrate 402 are bonded to each other by hardening the sealant 409.

Next, the heat energy is applied from the outside of the first substrate 401 toward the sealant 409. The heat energy may pass through the heat energy passing portion 413 and may be applied to the sealant 409. Accordingly, as illustrated by using a dotted line, the first substrate 401 and the second substrate 402 are cut in a portion in which the sealant 409 is formed. According to the present embodiment, after a laser beam is irradiated toward the sealant 409, the first substrate 401 and the second substrate 402 may be cut by using a cutting wheel.

As described above, according to the one or more of the above exemplary embodiments, a size of the bezel of the display device may be minimized.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A display device comprising:
   a display panel having a first substrate and a second substrate bonded to the first substrate and in which a display area displaying an image and a non-display area extending towards the outside of the display area, are formed;
   a sealant arranged between the first substrate and the second substrate and surrounding the display area;
   a plurality of adjacent wires arranged on the first substrate;
   a black matrix arranged on the second substrate, at least a portion of the black matrix overlapping the sealant;
   a heat energy passing portion through which a heat energy applied from the outside towards the sealant passes, the heat energy passing portion having been formed in the display panel adjacent the sealant, the heat energy passing portion is a space formed by removing a portion of the overlapping portion of the black matrix; and
   a heat energy blocking portion is formed on the first substrate in a pathway of the heat energy passing from an upper portion of the second substrate through the heat energy passing portion.

2. The display device of claim 1, the heat energy blocking portion has a dam shape formed of a polymer resin.

3. The display device of claim 1, the heat energy blocking portion is a blue photoresist.

4. The display device of claim 1, further comprised of:
   an over-coating layer completely covering the black matrix is further formed on the second substrate, and
   a common electrode is formed on the over-coating layer.

5. The display device of claim 1, the sealant has a black color.

6. The display device of claim 1, a liquid crystal is formed between the first substrate and the second substrate, and
   the display device further comprises a liquid crystal display in which a backlight unit is disposed below the display panel to irradiate light towards the display panel.

7. A method of manufacturing a display device, the method comprising:
   preparing a display panel in which a display area and a non-display area extending toward the outside of the display area are formed and which has a first substrate on which wires are arranged and a second substrate on which a black matrix is formed;
   forming a sealant between the first substrate and the second substrate and bonding the first substrate and the second substrate, at least a portion of the black matrix overlapping the sealant;
   cutting the first substrate and the second substrate by applying a heat energy,
   forming a heat energy passing portion through which the heat energy applied from the outside towards the sealant passes, the heat energy passing portion being formed in the display panel adjacent the sealant, the heat energy passes through the heat energy passing portion and is applied to a portion in which the sealant is formed, the heat energy passing portion is a space formed by removing a portion of the overlapping portion of the black matrix, and the heat energy is applied to the sealant by passing from the outside of the second substrate through the formed space; and
   forming a heat energy blocking portion on the first substrate in a pathway of the heat energy passing from an upper portion of the second substrate through the heat energy passing portion.

\* \* \* \* \*